3,142,577
PROCESS FOR FORMING A JELLIED CRANBERRY SAUCE
Edward E. Anderson, Lexington, William F. Hampton, South Duxbury, and Arthur W. Anti, Kingston, Mass., assignors, by direct and mesne assignments, to Ocean Spray Cranberries, Inc., Hanson, Mass., a corporation of Delaware
No Drawing. Filed Dec. 27, 1960, Ser. No. 78,238
2 Claims. (Cl. 99—129)

This invention relates to a new food product and more particularly to a jellied sauce made from cranberries.

One of the more popular ways to market cranberries is in the form of a canned jellied sauce. In order to prepare this jellied product, it has always been thought necessary to remove thes kins and seeds from cranberries via a screening process and to the resultant puree was then added sugar and water, and the resulting mixture cooked to the desired end point. The term "sugar" will hereinafter be used as a generic term to cover sucrose, dextrose, invert sugar, and corn syrup solids, alone or in combination, in dry form or as liquid syrup. This removal of the skins and seeds not only required extra steps and extra labor, but meant that there was experienced a loss of approximately 10% by weight of the original cranberries. Since the skins and seeds are known to be not only edible, e.g., they are eaten in canned whole cranberry sauce, but also to contribute distinct flavor to the cranberries, it would be desirable to have a method by which a jellied cranberry sauce could be formed from the entire cranberries without the steps of the removal of the skins and seeds.

It is therefore a primary object of this invention to provide a process by which the entire cranberry may be used to form a jellied sauce. It is another object to provide a method of making a novel jellied cranberry sauce which contains the entire cranberry and which therefore eliminates the usual wasting of about 10% of the berries. These and other objects will be apparent in the following description of this invention.

By the process of this invention whole cranberries, either raw or cooked, are comminuted and the resulting cranberry puree is then heated with sugar and water and subsequently canned. The cranberries used may be frozen or fresh. If frozen, they are thawed first before processing.

In preparing the puree from the entire cranberry the degree of comminution is important for it is necessary to reduce the skin, which is relatively tough, and the seeds to a size range such that the puree will pass through a screen having perforations no larger than 0.027 inch in diameter. The grinding or comminution must be carried out so that substantially all of the particles thus formed have a maximum dimension of not greater than the 0.027 inch diameter of the perforations. Thus, it is necessary to reduce the skin to this size but not to form tightly rolled pieces which could conceivably be forced through the perforations of the screen. This, of course, would be undesirable. Where any appreciable amount of the particles forming the puree are larger than the 0.027 inch specified, the resulting jellied cranberry sauce does not possess a desirable smooth gel-like texture.

For practical purposes, it is preferable to maintain substantially all of the particles above about 0.006 inch in maximum dimension. Between the size range of 0.006 and 0.027 the puree gives a constantly smooth jellied sauce without objectionable discrete particles being present.

The cranberries, prior to comminution, may be raw or heated. If they are to be heated, this may be accomplished by heating the cranberries with water (50–100% of the cranberry weight) to 180° F. in a steam-jacketed thermascrew or other suitable equipment. In any event, the berries, of course, will be sorted and washed prior to processing.

Comminution may be accomplished by any known grinding apparatus which will reduce the entire berries to the size specified and which in particular reduces the skins without forming tightly rolled skin pieces. Thus, the apparatus must be capable of macerating the skins rather than just removing them and rolling them up. We have found a so-called Fitzpatrick comminuter or a Rietz disintegrator and their accessories particularly well suited to attaining the desired degree of comminution of the whole cranberry.

Once the cranberries have been properly comminuted, the resulting material which forms the puree is then mixed with an appropriate amount of sugar and water. The amount of water chosen will be that which is sufficient to form a smooth gel when the mixture is cooked and then cooled. This means that the amount of water will be adjusted to the amount of pectin contained in the cranberries, the latter being present in such quantity as to gel the fruit, sugar and liquid materials. After the puree has been mixed with the sugar and the water, it is heated to destroy all enzymatic and microbiological action and to cause the necessary interaction between the sugar, puree and the pectin to effect gel formation. Heating of the final product is preferably carried out between about 180 and 218° F. for from one to 10 minutes. At the lower temperatures the longer periods of heating are required to achieve the required cooking action and enzymatic and microbiological inactivation.

The resulting hot liquid mixture which will form the gel when cooled is then canned by any suitable technique, such as by packing the liquid in cans or jars under vacuum. Thus, the liquid may be transferred to the container at a closing temperature sufficient to assure sterilization of the container as well as a suitable vacuum in the can after cooling. The cans may also be steam-flow closed or vacuum closed. Another process involves replacing the air in the heated space with an inert gas such as nitrogen prior to sealing.

The process and product of this invention may be further described in the following examples which are meant to be illustrative and not limiting.

*Example I*

Frozen Early Black cranberries were thawed to 50–60° F. One hundred and twenty pounds of cranberries and 65 pounds of water were heated in a thermascrew to a temperature of 180–185° F. The heated product was then fed into a Rietz disintegrator equipped with a .016 inch screen at the rate of approximately 30 pounds per minute. The product was completely macerated without any skin or seed build-up on the inside of the screen.

Part of this resultant puree was added to an equal weight of 71.5% cane sugar syrup (to give a finished product at 40% sugar) at 180° F. The ingredients were well mixed and heated to 195–205° F., canned, and cooled to 110° F. The final cooled jellied cranberry sauce was found to have a firm gel, smooth, texture, and free from any objectionable discrete particles.

*Example II*

Similarly, as in Example I 120 pounds of raw Early Black cranberries and 65 pounds of water were proportionally fed into the Rietz disintegrator equipped with a .016 inch screen at approximately 16 pounds per minute. Again the cranberries were completely macerated to produce a puree free from any objectionable particles. There was no skin or skin build-up on the inside of the screen.

Part of the puree was then added to an equal weight of 71.5% cane sugar syrup (to give a finished product containing 40% sugar) at 180° F., well mixed, and heated to 190–215° F., canned and water-cooled at 110° F.

The jellied cranberry sauce produced had a firm gel, a fresher cranberry flavor and free from objectionable small skin or seed particles.

*Example III*

Equal weights of fresh Howe cranberries and water were fed into a screw feeder which emptied directly into a Fitzpatrick comminuter wherein the berries were completely macerated through a #000 (.020 inch) screen.

Eight pounds of the resultant cranberry puree was added to enough 71.5% cane sugar syrup (7.6 pounds) at 180° F. to give a finished product containing 40% sugar. The cranberry sauce was then well mixed and heated to 190–215° F., canned and water-cooled to 110° F.

The jellied cranberry sauce produced by this method had a firm gel, a fresher cranberry flavor and was free from any objectionable small skin or seed particles.

The above description and examples show that, by the process of this invention, a new jellied cranberry sauce may be made from the whole cranberry. All of the cranberry is used and the time and labor required to make a finished product are materially decreased.

We claim:

1. Process for forming a jellied cranberry sauce including the steps of reacting the pectin in cranberries with sugar at an elevated temperature and subsequently cooling to form a gel, characterized by the step of comminuting, prior to said reacting step, all of the cranberries to form a puree of finely divided particles substantially all of which have maximum dimensions between 0.006 and 0.027 inch.

2. Process for forming a jellied cranberry sauce, comprising the steps of comminuting whole cranberries to form a puree of finely divided particles substantially all of which have maximum dimensions ranging between 0.006 and 0.027 inch, heating said puree with sugar and water to between about 180 and 218° F., and cooling the resulting composition thereby to form a gel.

References Cited in the file of this patent

UNITED STATES PATENTS

| | | |
|---|---|---|
| 2,037,029 | Knowles | Apr. 14, 1936 |
| 2,752,253 | Talburt et al. | June 26, 1956 |

OTHER REFERENCES

"Everybody's Cookbook" by Lord, revised edition, Harcourt, Brace and Company, 1937, New York, page 404.

Jacobs: The Chemistry and Technology of Food and Food Products, 1951, vol. III, p. 2207, Interscience Publishers, Inc., New York, N.Y. TX 531 J2, 1951.